(12) United States Patent
Ward

(10) Patent No.: US 7,916,438 B2
(45) Date of Patent: Mar. 29, 2011

(54) RESIDUAL CURRENT DEVICE

(75) Inventor: Patrick Ward, Ballinasloe (IE)

(73) Assignee: Atreus Enterprises Limited, Ballinasloe (IE)

( * ) Notice: Subject to any disclaimer, the term of this patent is extended or adjusted under 35 U.S.C. 154(b) by 92 days.

(21) Appl. No.: 12/312,508

(22) PCT Filed: Jan. 11, 2008

(86) PCT No.: PCT/EP2008/000194
§ 371 (c)(1),
(2), (4) Date: May 14, 2009

(87) PCT Pub. No.: WO2008/107035
PCT Pub. Date: Sep. 12, 2008

(65) Prior Publication Data
US 2010/0046127 A1  Feb. 25, 2010

(30) Foreign Application Priority Data

Mar. 7, 2007 (IE) .................................. S2007/0151

(51) Int. Cl.
*H02H 3/00* (2006.01)
*H02H 9/08* (2006.01)
(52) U.S. Cl. ........................................................ 361/42
(58) Field of Classification Search ...................... 361/42
See application file for complete search history.

(56) References Cited

U.S. PATENT DOCUMENTS

| 4,042,967 | A | | 8/1977 | Yamamoto |
| 4,707,759 | A | * | 11/1987 | Bodkin ............................ 361/48 |
| 5,661,623 | A | * | 8/1997 | McDonald et al. ............. 361/42 |
| 6,052,266 | A | | 4/2000 | Aromin |
| 6,975,191 | B2 | * | 12/2005 | Ward .............................. 335/18 |
| 7,242,557 | B2 | * | 7/2007 | Ward .............................. 361/42 |

* cited by examiner

*Primary Examiner* — Ronald W Leja
(74) *Attorney, Agent, or Firm* — The Nath Law Group; Jerald L. Meyer; Derek Richmond

(57) ABSTRACT

A residual current device comprises a circuit (CT, 10, 12) for detecting a current imbalance in an AC supply to a load indicative of a residual current and providing a corresponding output. A relay RLA has contacts SW1 in the AC supply to the load. The relay contacts SW1 automatically close when a closing current is passed through the relay and is thereafter maintained closed so long as a holding current, less than the closing current, passes through the relay. A capacitor C1 is connected to the AC supply in parallel with the relay RLA such that, upon application of power from the AC supply, current flows to the charge storage device. An electronic switch SCR2 in series with the relay is turned on when the voltage on the capacitor exceeds the breakover voltage of a Zener diode ZD2 to allow discharge of the capacitor through the relay to provide a current exceeding the closing current, the AC supply thereafter providing a holding current for the relay at least when the supply is at a certain minimum voltage. An output from the current imbalance detecting circuit opens contacts SW3 in series with the relay to interrupt the current flow through the relay.

6 Claims, 4 Drawing Sheets

RESIDUAL CURRENT DEVICE

This is a national phase Application of PCT/EP2008/000194 filed 11 Jan., 2008 claiming priority benefit from IE Application No. S2007/0151, filed 7 Mar. 2007, the entire content of which is hereby incorporated by reference in its entirety.

BACKGROUND OF THE INVENTION

1. Field of the Invention

This invention relates to residual current devices.

2. Prior Art

Residual current devices (RCDs) detect earth fault currents, which are also known as residual currents. The principle of operation of RCDs is very well known.

RCDs can be grouped into two broad categories—voltage independent (VI) and voltage dependent (VD) types. The VI types use the detected residual current as the source of energy to enable them to operate. The VD types use the mains supply as the source of energy to enable them to operate. The VI types are commonly referred to as electromechanical types, and VD RCDs are often referred to as electronic types.

RCDs can also be divided into two other categories—those that are mechanically or magnetically latched (ML) to enable them to be closed and remain closed (these include VD and VI types), and those that are electrically latched (EL) in that they require the mains supply to enable them to be closed and to remain closed.

The EL types can be further subdivided into those that open automatically on loss of supply and remain open on restoration of the supply (for convenience here referred to as ELRO—electrically latched remains open), and those that open automatically on loss of supply but reclose automatically on restoration of the supply (for convenience here referred to as ELAR—electrically latched auto recloses).

These four RCD types are summarised as follow

VIML voltage independent mechanically latching

VDML voltage dependent mechanically latching

VD-ELRO voltage dependent electrically latching—remains open

VD-ELAR voltage dependent electrically latching—auto recloses

All of these RCDs have advantages and disadvantages which users can take into consideration when selecting an RCD for a particular application. For example, the VI type can operate down to virtually zero volts, but can be disabled under a double grounded neutral fault condition. The VDML uses electronic circuitry to provide for enhanced performance such as detection of pulsating DC fault currents, but can be disabled in the event of loss of supply neutral when used on a single phase supply. It should be noted that the risks involved in both of the above cases are generally considered to be very low and have not precluded the extensive use of such RCDs worldwide. The ELRO also uses electronic circuitry to provide for enhanced performance, and can protect motors from burn out under conditions of low supply voltage by auto tripping under these conditions. However, ELRO devices have to be manually reclosed on restoration of the supply, which can be an inconvenience. The ELAR uses electronic circuitry to provide for enhanced performance, and can protect motors from burn out under conditions of low supply voltage by auto tripping under these conditions, and also auto recloses on restoration of supply.

From the above, the ELAR would appear to be the ideal RCD. Unfortunately, the need to enable such RCDs to open automatically on loss of supply and reclose automatically on restoration of the supply has to date required very sophisticated and bulky electronic circuitry and components to provide this functionality. These problems are seriously compounded by the additional requirement for these RCDs to remain open after opening in response to a residual current, even if the mains supply is temporarily removed and restored after such opening.

FIG. 1 is an example of a simple ELAR RCD. In FIG. 1, an AC mains supply is fed to a load L via two contacts SW1 of a relay RLA, the live and neutral mains conductors L, N passing through a current transformer CT en route to the load. The output of the CT is fed to an RCD integrated circuit (IC) 10. The function of the CT and IC 10 is to detect a current imbalance in the AC supply to the load indicative of a residual current, and when such an imbalance is detected to provide a high output voltage on the line 12 sufficient to turn on a silicon controlled rectifier SCR1. The construction and operation of such components are well known. The IC 10 may be a type WA050, supplied by Western Automation Research & Development and described in U.S. Pat. No. 7,068,047. The RCD is powered from the mains via a bridge rectifier X1. The IC 10 is supplied with current via resistor R2.

A solenoid SOL, a capacitor C1 and the relay RLA are connected in parallel to the bridge rectifier X1 via a resistor R1. The SCR1, which is normally held in a non-conducting state by a low voltage on the line 12 from the IC 10, is connected in series with the solenoid SOL. The relay contacts SW1 are normally open. An example of a suitable relay RLA is shown in FIG. 2.

RLA comprises a bobbin 14 with a coil (not shown) wound on it. A ferromagnetic pole piece 16 extends through the bobbin, the top of the pole piece being positioned below a ferromagnetic element 18 fixed within a moving contact carrier 20. The contact carrier 20 and the moving contacts 22 are biased towards an open position away from fixed contacts 24 by a spring 26, so that a substantial air gap exists between the pole piece 16 and the ferromagnetic element 18. The coil has a relatively large number of turns in its winding so as to maximise the ampere turns providing electromagnetic energy.

Prior to the application of power to the RCD, the relay RLA is de-energised and its contacts 22, 24 are open, so the mains supply is disconnected from the load L (the moving and fixed contacts 22, 24 constitute the contacts SW1 of FIG. 1). When power is applied to the RCD the current through R1 will initially flow primarily to C1 to charge it up. As C1 acquires charge, more of the R1 current will be diverted into the RLA coil to establish an electromagnetic field which will be concentrated in the pole piece 16 and thereby provide an attracting force on the ferromagnetic element 18. At a certain threshold of ampere-turns known as the closing ampere turns the bias of the spring 26 will be overcome by the magnetic attraction between the pole piece 16 and the ferromagnetic element 18 and the contact carrier 20 will move automatically towards the pole piece 16 with the result that the contacts SW1 will close and thereby provide power to the load. Thereafter, C1 will sustain the RLA coil with current during the low voltage troughs of the rectified mains supply. A Zener diode ZD1 clamps the voltage on capacitor C1 to a safe level for the capacitor and the relay coil.

In the event of a sufficient reduction in the level of the mains supply voltage, the current through the RLA coil will be insufficient to keep the contact carrier 20 in the closed position, and the contact carrier and the contacts SW1 will automatically revert to the open position. If the mains voltage then increases to a sufficiently high level so as to reach or exceed the closing ampere turns current level, the relay RLA will be re-energised and its contacts SW1 will reclose automatically as before.

The RLA coil will have a relatively large number of turns to enable it to achieve the required number of ampere turns to cause automatic closing of the contacts SW1. This results in the RLA coil having a relatively high impedance, typically a few thousand ohms. In contrast the solenoid SOL will have a relatively low impedance, typically less than 200 ohms, because it will only be energised momentarily as will be described later.

In the event of a residual current of sufficient magnitude, the output of the CT will cause the IC 10 to turn on SCR1 via output line 12, which in turn will cause the solenoid SOL to be energised and open associated solenoid contacts SW2. This in turn will result in removal of supply to C1 and also cause C1 to discharge through the relatively low impedance of the solenoid SOL. The resultant discharge of C1 will cause the relay RLA to de-energise and its contacts to open. It is generally a requirement of RCD product standards that the resetting means must be a trip free type which ensures that the solenoid and load contacts cannot be held closed if the RCD trips in response to a residual current. The solenoid mechanism is therefore designed such that when its contact opens it remains open until manually reset. This adds to the complexity of the design of the resetting means. The design of FIG. 1 has a number of drawbacks, as follows:

- The current required to close the relay RLA will be quite large, typically about 15-20 mA. This results in considerable power dissipation in R1 and RLA, which have to be suitably rated to handle this power.
- The level of AC supply voltage at which RLA automatically closes and opens is highly dependent on the value and tolerance of C1 and the efficiency of RLA, resulting in variances in these values from one RCD to the next.
- The solenoid SOL has to be suitably rated to handle the relatively high operating voltage and current required to ensure reliable opening of the solenoid contacts SW2.
- The solenoid contacts are fitted in the high voltage part of the circuit, giving rise to problems of voltage rating and dielectric strength, etc.
- SCR1 has to be suitably rated to withstand the relatively high operating voltage and current to which it is exposed.
- The circuit requires a full wave bridge rectifier to ensure adequate supply current under all conditions.

It is an object of the present invention to provide an RCD which mitigates one or more of the above disadvantages.

SUMMARY OF THE INVENTION

According to the present invention there is provided a residual current device comprising: a circuit for detecting a current imbalance in an AC supply to a load indicative of a residual current and providing a corresponding output, a relay having contacts in the AC supply to the load, means for providing a current flow through the relay sufficient to maintain the relay contacts closed at least when the supply is at a certain minimum voltage, and at least one further contact in series with the relay, the further contact being opened in response to an output from the current imbalance detecting circuit to interrupt the current flow through the relay and thereby disconnect the load.

The invention also provides a residual current device comprising: a circuit for detecting a current imbalance in an AC supply to a load indicative of a residual current and providing a corresponding output, a relay having contacts in the AC supply to the load, the relay contacts automatically closing when a current greater than a predetermined closing current is passed through the relay and being maintained closed by passing a holding current, less than the closing current, through the relay, the relay contacts automatically opening if the current through the relay falls below the holding current, a charge storage device connected to the AC supply in parallel with the relay such that, upon application of power from the AC supply, current flows to the charge storage device to charge the latter up, and an electronic switch in series with the relay, the switch being turned on when the voltage on the charge storage device exceeds a predetermined threshold thereby to allow discharge of the charge storage device through the relay to provide a current exceeding the closing current, the AC supply thereafter providing a holding current for the relay at least when the supply is at a certain minimum voltage, wherein the residual current device includes at least one further contact in series with the relay, the further contact being opened in response to an output from the current imbalance detecting circuit to interrupt the current flow through the relay and thereby disconnect the load.

Preferably the residual current device comprises a permanent magnet relay which is energised in response to an output from the current imbalance detecting circuit to open contacts in series with the firstmentioned relay to cut off the current flow through the latter.

In a preferred embodiment the permanent magnet relay is connected to the supply in parallel with the firstmentioned relay and has a normally-off further electronic switch in series therewith which is switched on by the output from the current imbalance detecting circuit to energise the permanent magnet relay.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS

Figure 1:
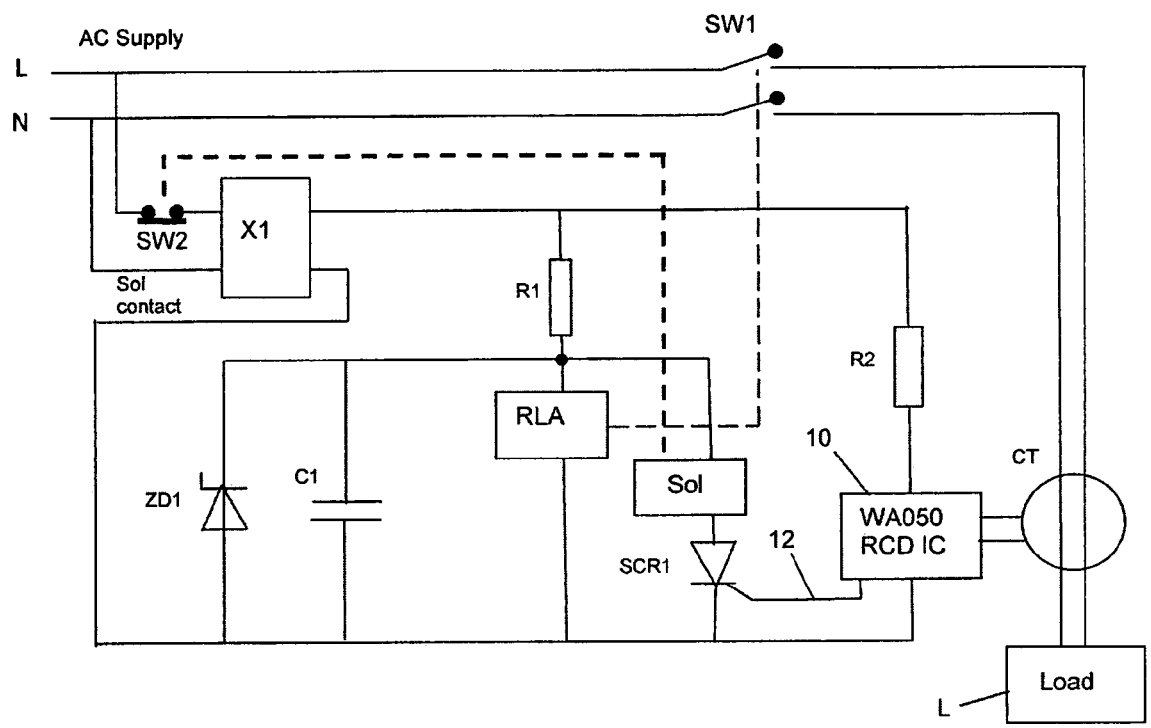
FIG. 1, previously described, is a circuit diagram of a typical ELAR type RCD.
Figure 3:
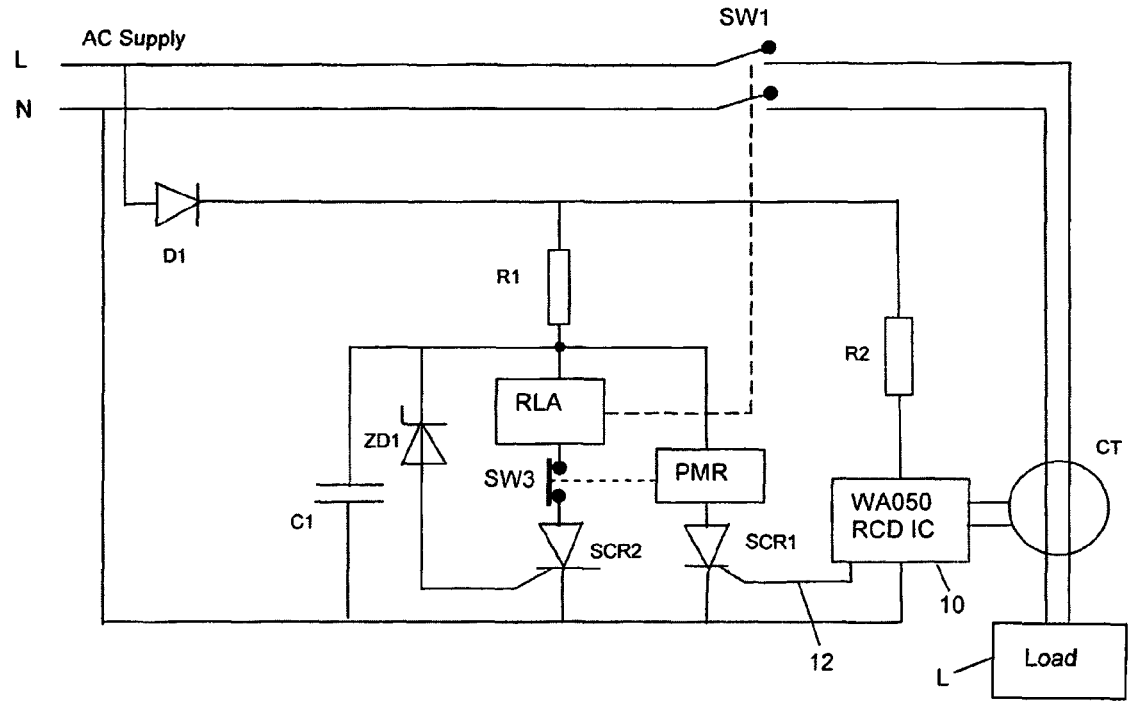
FIG. 3 is a circuit diagram of an ELAR type RCD according to a first embodiment of the invention.

The embodiment shown in FIG. 3 mitigates the drawbacks of the arrangement of FIG. 1, and provides additional benefits.

Figure 4:
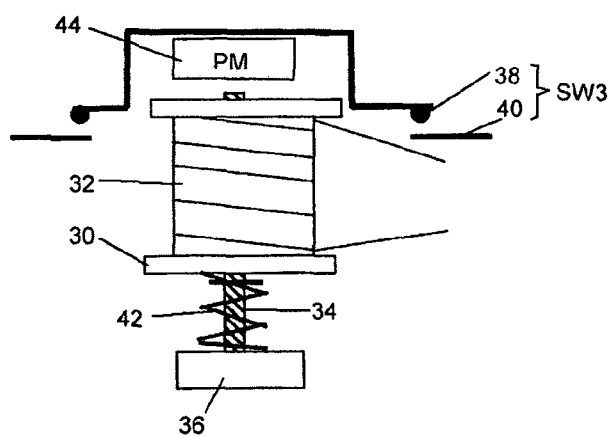
FIG. 4 is a schematic diagram of a permanent magnet relay used in the circuit of FIG. 3.

In FIG. 3 the RCD is powered via a diode D1 rather than a bridge rectifier. The solenoid SOL has been replaced by a permanent magnet relay PMR. The PMR contacts SW3 and a second silicon controlled rectifier SCR2 are connected in series with the relay RLA. A Zener diode ZD2 is connected between C1 and the gate of SCR2. The remainder of the circuit is substantially the same as that shown in FIG. 1. A schematic diagram of the PMR is shown in FIG. 4.

The PMR comprises a bobbin 30 and a coil 32 wound on the bobbin. A ferromagnetic plunger 34 passes through the bore of the bobbin. One end of the plunger 34 is fitted with a reset button 36 which is biased downwardly (as seen in FIG.

4) by a reset spring 42. The other (upper) end of the plunger 34 faces a permanent magnet 44 to which is fixed a moving contact 38, the moving contact 38 being biased into an open position away from a fixed contact 40 by a biasing means such as a spring, not shown. A more detailed description of a PMR of this type is given in U.S. Pat. No. 6,975,191. The moving and fixed contacts 38, 40 constitute the contacts SW3 of FIG. 3.

When the reset button 36 is pushed upwardly against the bias of the spring 42, the top of the plunger 34 is presented to the magnet 44 and the two become magnetically entrained. When the reset button 36 is released, the magnet 44 and moving contact 38 are drawn downwards by the spring 42 until the moving contact 38 engages the fixed contact 40. The PMR is now in the latched state. When a current of sufficient magnitude and polarity is passed through the coil 32, the magnetic holding force of the permanent magnet 44 will be reduced due to the flux produced by an opposing electromagnetic field with the result that the magnet 44 will be released from the plunger 34 and the magnet 44 and its moving contact 38 will revert to the open position. The PMR contacts SW3 can only be reclosed by manual means.

Referring back to FIG. 3, when mains power is initially applied to the RCD, the capacitor C1 will charge up via R1 as before. However, at this stage, no current will flow through the RLA coil because SCR2 will be in its non conducting state. When the voltage on C1 reaches a certain level, the breakover voltage of ZD2 will be exceeded and current will flow into the gate of SCR2, at which point it will turn on. At that instant, a large current (greater than the closing current) will flow from C1 through the RLA coil resulting in an electromagnetic field of sufficient strength as to cause automatic closing of RLA contacts SW1 and thereby provide power to the load L. Provided the supply voltage remains at or above a certain minimum value, the resistor R1 and the remaining charge on C1 will maintain a current flow through the RLA coil less than the closing current but greater than the holding current so as to keep RLA contacts SW1 closed. However, if the supply voltage is sufficiently reduced, the current flow through the RLA coil will be reduced to a level at which it can no longer hold the RLA in the closed state, at which point the RLA contacts SW1 will open. When the supply voltage is sufficiently restored, the RLA contacts SW1 will automatically reclose.

ZD2 provides a triggering means to facilitate automatic and controlled energisation of RLA and resultant closing of SW1 contacts. This triggering means may be achieved by other suitable devices, for example a diac.

In the event of a residual current of sufficient magnitude, the output of the CT will cause the IC 10 to turn on SCR1 via output line 12, which in turn will cause C1 to discharge via the PMR coil 32, causing the PMR contacts SW3 to open as previously described. The interruption in current flow through the relay coil will cause the relay RLA to be de-energised and its contacts SW1 to open. It should be noted that in addition to determining the closing voltage for the relay RLA, ZD2 also limits the voltage on C1 to a safe level.

The arrangement of FIG. 3 provides considerable benefits and features over and above the arrangement of FIG. 1.

Figure 2:
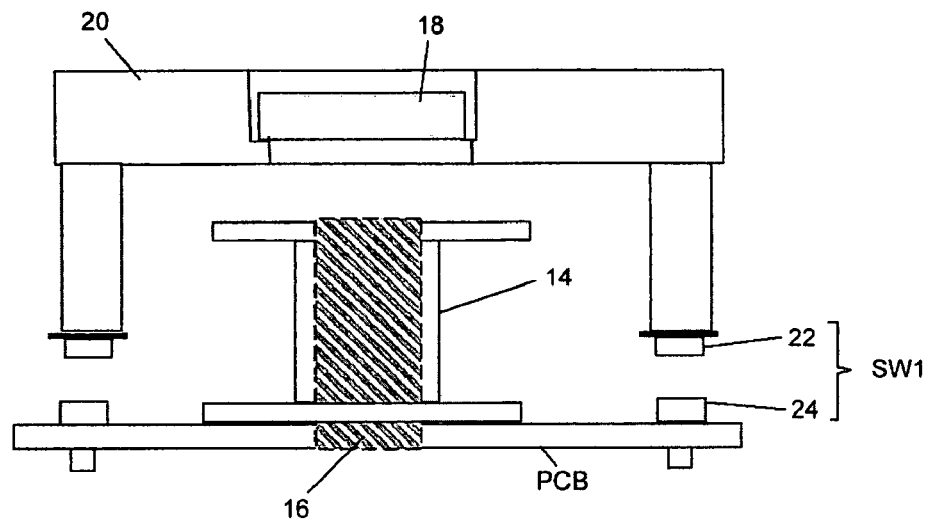
FIG. 2, previously described, are schematic end and side views of the relay RLA used in the circuit of FIG. 1.
Figure 2:
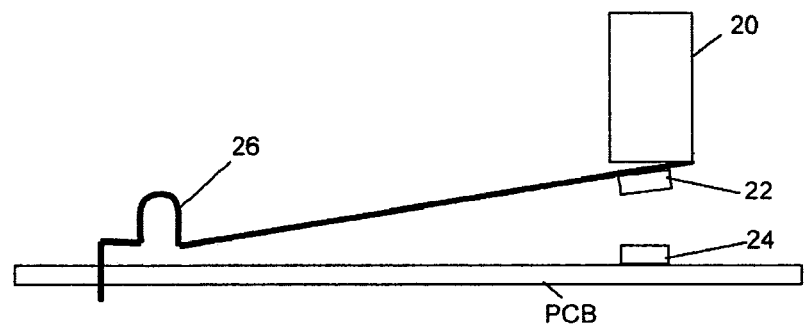

It is well known that the current required to close a relay of the type shown in FIG. 2 (the closing current) is substantially greater than the current required to maintain the relay in the closed position (the holding current). This is because in the open state, a substantial air gap will exist between the relay pole piece and the ferromagnetic element coupled to the moving contacts, and this air gap will result in a high level of magnetic reluctance or resistance. The current flow through the relay coil in the open state has to generate sufficient electromagnetic force to overcome this reluctance and draw the ferromagnetic element to the closed position. Once the relay is in the closed state, the air gap will be substantially reduced with the result that magnetic reluctance will also be reduced. Because of this, it is possible to substantially reduce the current flow through the relay coil before the relay will revert to the open state. The difference between the closing current and the holding current can be greater than 80%.

The arrangement of FIG. 3 takes advantage of this effect. In FIG. 3, when power is applied to the circuit, current flows through R1 to charge up C1. However, because SCR2 is in the off state, no current will flow initially through the RLA coil. When the voltage on C1 exceeds the breakover voltage of ZD2, SCR2 will turn on with the result that there will be an immediate surge of current from C1 through the RLA coil. The component values are chosen to ensure that under this condition, the RLA contacts SW1 close automatically and thereby provide power to the load L. The standing current flow through R1 is just sufficient to maintain RLA in the closed state and to provide C1 with a charge so that C1 can keep RLA closed during low levels of the AC supply voltage. Thus, the current flow in the circuit of FIG. 3 will be substantially less that that of the arrangement of FIG. 1, thereby resulting in a substantially reduced level of power dissipation. R1 size and rating can thereby be optimised solely for the purpose of providing RLA with its holding current.

The voltage level at which RLA closes is largely determined by ZD2, which in turn ensures that the contacts can close at a consistent level of AC supply voltage. By drawing only the holding current from the mains supply, a diode can be used instead of a bridge rectifier. However, a bridge rectifier may be used to facilitate the use of an alternative relay and associated electronic components.

The PMR has a stored energy device in the form of the permanent magnet 44 with the result that the PMR contacts 38, 40 can be latched by a very simple arrangement obviating the need for complex mechanical coupling, etc. The reset spring 42 provides the effective contact pressure, and the strength of the reset spring can be brought to a level just below the holding force of the permanent magnet. As a result, the energy required to open the PMR contacts will be very low and just sufficient to cause the permanent magnet to release its contact. Furthermore, the PMR contacts are located in a low voltage part of the circuit, mitigating problems of contact rating, dielectric strength, etc. In addition to minimising stress and improving the reliability of the contact releasing means, additional benefits accrue from the PMR in terms of its design, size and cost.

Key features of new design of FIG. 3 are:
The closing current for the relay RLA is not directly derived from the mains supply, but rather from a charge stored in C1.
Zener diode ZD2 acts as a voltage clamp on C1, but also acts as the trigger to cause auto closing of RLA.
Because the PMR has a permanent magnet, it has stored energy which keeps its contact closed, but furthermore it is only necessary to weaken the PM holding force by a small amount to cause automatic opening of the PMR contact and auto opening of RLA.
Because the PMR contact is in the RLA coil current path, opening of the PMR contact completely removes any current flow through RLA coil, causing faster de-energizing of RLA and faster opening of the load contacts than can occur in FIG. 1.

Figure 5:
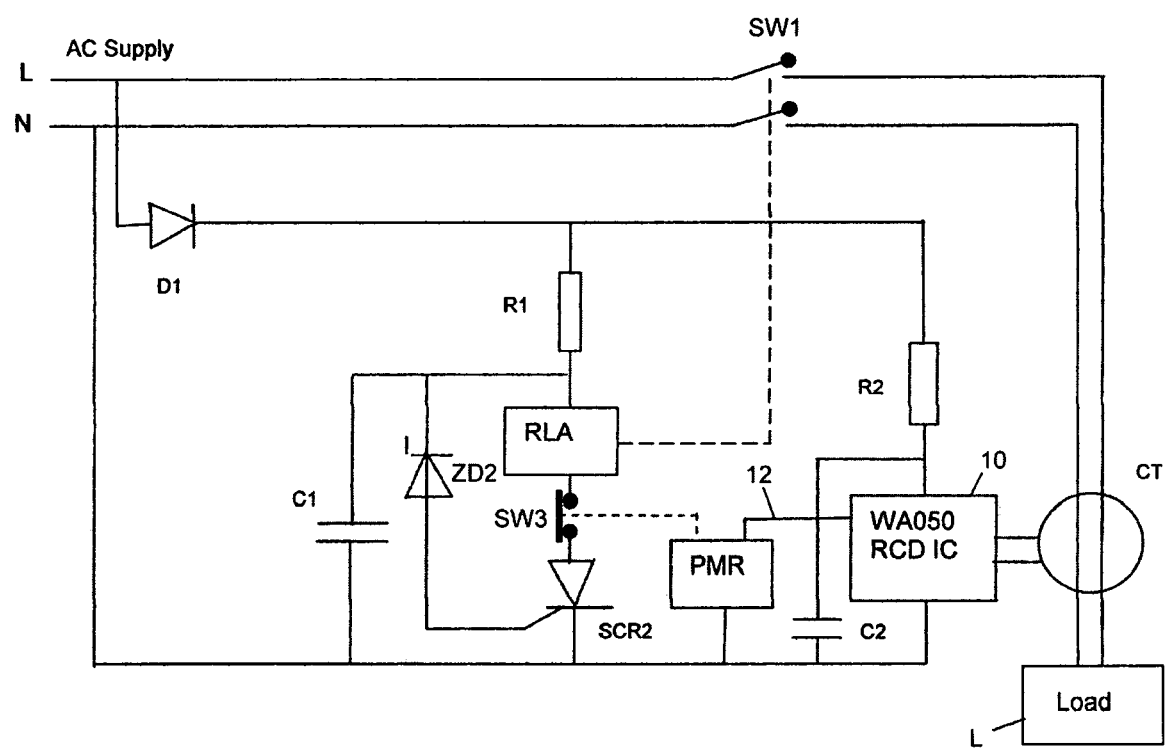
FIG. 5 is a circuit diagram of an ELAR type RCD according to a second embodiment of the invention.

In an alternative embodiment, FIG. 5, with a sufficiently efficient PMR it is possible to dispense with the SCR1 and drive the PMR directly from the IC 10 via output 12. In this case, the PMR would not be directly dependent on any current flow from C1 or via R1. Capacitor C2 acquires a charge via R2, and provides the current flow through the PMR coil when the IC 10 output goes high.

The invention is not limited to the embodiments described herein which may be modified or varied without departing from the scope of the invention.

The invention claimed is:

1. A residual current device comprising:
    a circuit for detecting a current imbalance in an AC supply to a load indicative of a residual current and providing a corresponding output,
    a relay having contacts in the AC supply to the load, the relay contacts automatically closing when a current greater than a predetermined closing current is passed through the relay and being maintained closed by passing a holding current, less than the closing current, through the relay, the relay contacts automatically opening if the current through the relay falls below the holding current, and
    at least one further contact in series with the relay, the further contact being opened in response to an output from the current imbalance detecting circuit to interrupt the current flow through the relay and thereby disconnect the load,
    a charge storage device connected to the AC supply in parallel with the relay such that, upon application of power from the AC supply, current flows to the charge storage device to charge the latter up, and
    an electronic switch in series with the relay, the switch being turned on when the voltage on the charge storage device exceeds a predetermined threshold thereby to allow discharge of the charge storage device through the relay to provide a current exceeding the closing current, the AC supply thereafter providing a holding current for the relay at least when the supply is at a certain minimum voltage.

2. A residual current device as claimed in claim 1, comprising a permanent magnet relay which is energised in response to an output from the current imbalance detecting circuit to open the further contact.

3. A residual current device as claimed in claim 2, wherein the permanent magnet relay is connected to the supply in parallel with the first mentioned relay and has a further electronic switch in series therewith which is switched on by the output from the current imbalance detecting circuit to energise the permanent magnet relay.

4. A residual current device as claimed in claim 2 wherein the permanent magnet relay is energised directly by the output from the current imbalance detecting circuit.

5. A residual current device as claimed in claim 1, wherein the first mentioned electronic switch is turned on when the voltage on the charge storage device exceeds the breakover voltage of a triggering means connected between the charge storage device and the switch.

6. A residual current device as claimed in claim 1, wherein the first mentioned electronic switch is an SCR.

* * * * *